United States Patent [19]
Eum et al.

[11] Patent Number: 6,018,409
[45] Date of Patent: Jan. 25, 2000

[54] MULTI-BEAM SCANNING APPARATUS

[75] Inventors: Jae-yong Eum, Suwon; Won-hyung Lee, Seoul; Cheol-young Han, Suwon, all of Rep. of Korea; Gary H. Conners, Rochester, N.Y.

[73] Assignee: Samsung Electronics Co., Ltd., Kyungki-do, Rep. of Korea

[21] Appl. No.: 09/088,485

[22] Filed: Jun. 2, 1998

[30] Foreign Application Priority Data

Dec. 13, 1997 [KR] Rep. of Korea ..................... 97-68568

[51] Int. Cl.[7] .............................. G02B 26/08; G02B 5/32
[52] U.S. Cl. ............................ 359/204; 359/17; 359/18; 359/201; 359/209
[58] Field of Search ............................. 359/17, 18, 201, 359/204, 209

[56] References Cited

U.S. PATENT DOCUMENTS

| | | | |
|---|---|---|---|
| 4,761,046 | 8/1988 | Funato | 359/18 |
| 5,408,095 | 4/1995 | Atsuumi et al. | 359/208 |
| 5,805,315 | 9/1998 | Iwamatsu et al. | 359/18 |

FOREIGN PATENT DOCUMENTS 62-127820  6/1987  Japan .

*Primary Examiner*—Cassandra Spyrou
*Assistant Examiner*—Darren E. Schuberg
*Attorney, Agent, or Firm*—Sughrue, Mion, Zinn Macpeak & Seas, PLLC

[57] ABSTRACT

A multi-beam scanning apparatus includes at least two optical sources, a beam deflector having a deflection disc with a plurality of sectors for diffracting and transmitting incident beams, and a driving source for rotating the deflection disc, for deflecting and projecting beams emitted from the optical sources. A beam corrector installed along a light path, for correcting the beams deflected by the beam deflector.

6 Claims, 5 Drawing Sheets

MULTI-BEAM SCANNING APPARATUS

BACKGROUND OF THE INVENTION

1. Field of the Invention

The present invention relates to a printer and, more particularly, to a multi-beam scanning apparatus for simultaneously deflecting and scanning at least two beams emitted from optical sources to form an electrostatic latent image on a photoreceptor.

2. Description of the Related Art

A general beam scanning apparatus adopted in a printer charges a photoreceptor by a main scan using a beam deflector and a sub-scan using transfer or rotation of the photoreceptor.

FIG. 1 shows the optical arrangement of a conventional beam scanning apparatus which includes an optical source 1 for emitting a beam of light, a beam deflector 4 for deflecting the beam emitted from the optical source 1, and an f-theta (f-θ) lens 7 for correcting the error of light deflected by the beam deflector 4.

Also, a focusing lens 3 is installed between the optical source 1 and the beam deflector 4 to focus a divergent beam emitted from the optical source 1. The beam deflected by the beam deflector 4 is reflected by a reflective mirror 8, and the reflected beam proceeds toward a photosensitive drum (not shown).

The beam deflector 4 includes a motor 5 and a rotating polygonal mirror 6 which is rotated by the motor 5. The beam emitted from the optical source 1 is deflected according to the angle formed between itself and a reflective facet of the rotating polygonal mirror 6. Accordingly, the beam deflection is sensitive to wobble generated when the rotating polygonal mirror 6 is rotated.

In the case of a color printer, a separate beam scanning apparatus corresponding to each specific color must be installed, thus the color printer is complicated and large.

SUMMARY OF THE INVENTION

To solve the above problems, it is an object of the present invention to provide a multi-beam scanning apparatus by which at least two beams can be deflected and scanned together.

Accordingly, to achieve the above object, there is provided a multi-beam scanning apparatus comprising: at least two optical sources which emit beams of light; a beam deflector including a deflection disc having a plurality of sectors which diffract and transmit incident beams, and a driving source which rotates the deflection disc, for deflecting and projecting the beams emitted from the optical sources; and a beam corrector, installed along a light path, for correcting the beams deflected by the beam deflector.

The plurality of sectors are patterned at equal intervals on the deflection disc, and diffract and transmit incident beams according to the rotation of the deflection disc to project the diffracted beams in units of a single scan line.

The optical sources are installed so that the beams emitted from the optical sources are incident on the deflection disc at a line.

The optical sources are installed so that the emitted beams are incident on the same sector of the deflection disc.

According to another embodiment of the present invention, the optical sources are installed so that the emitted beams are respectively incident on different sectors of the deflection disc.

In this case, at least one of the optical sources is installed so that a beam emitted from the one optical source is incident on a first sector of the deflection disc, and at least another optical source is installed so that a beam emitted from the other optical source is incident upon a second sector symmetrical to said first sector.

Also, according to the present invention, the apparatus comprises at least two deflection discs, and the optical sources are disposed so that the emitted beams are incident intersectingly upon adjacent sectors of the deflection discs.

BRIEF DESCRIPTION OF THE DRAWINGS

The above object and advantages of the present invention will become more apparent by describing in detail preferred embodiments thereof with reference to the accompanying drawings, in which.

DETAILED DESCRIPTION OF THE PREFERRED EMBODIMENTS

Figure 1:
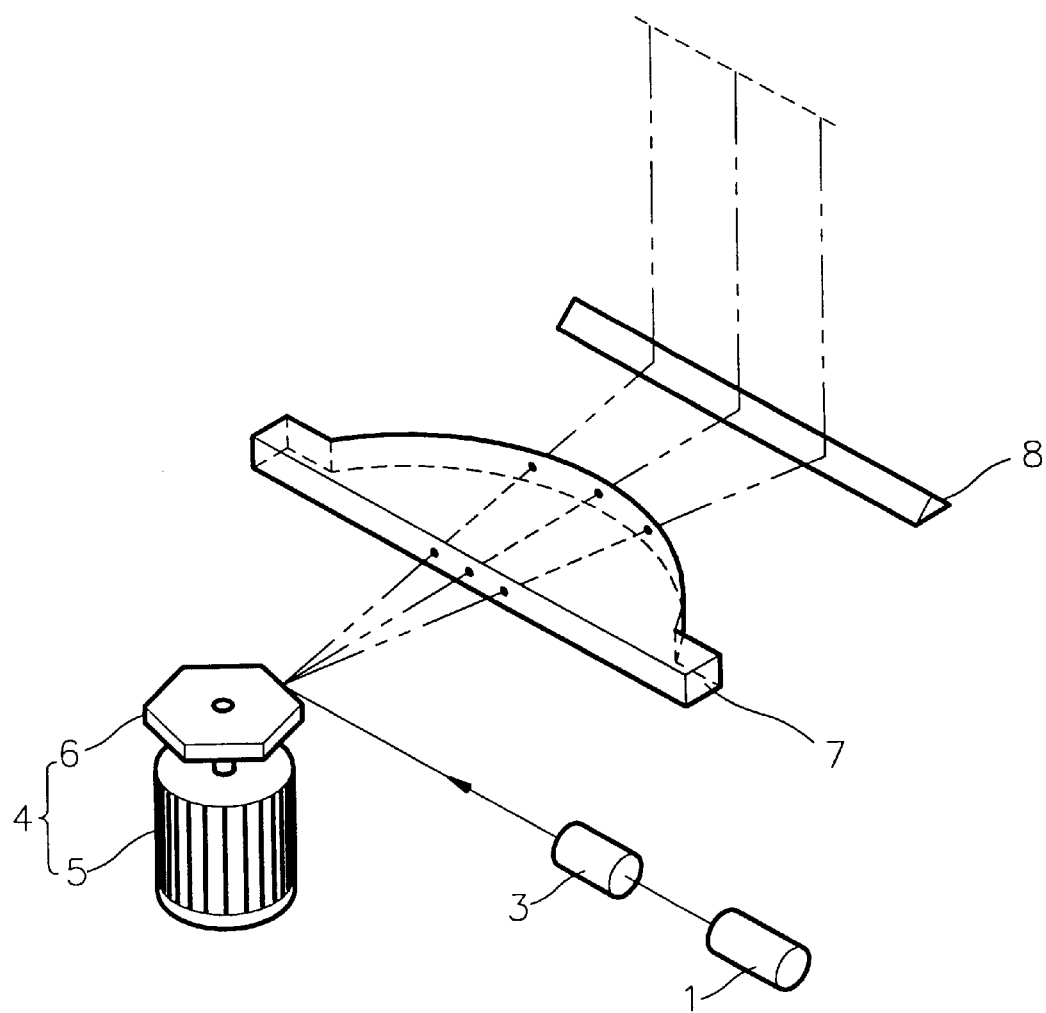
FIG. 1 is a perspective view of a conventional beam scanning apparatus.
Figure 2:
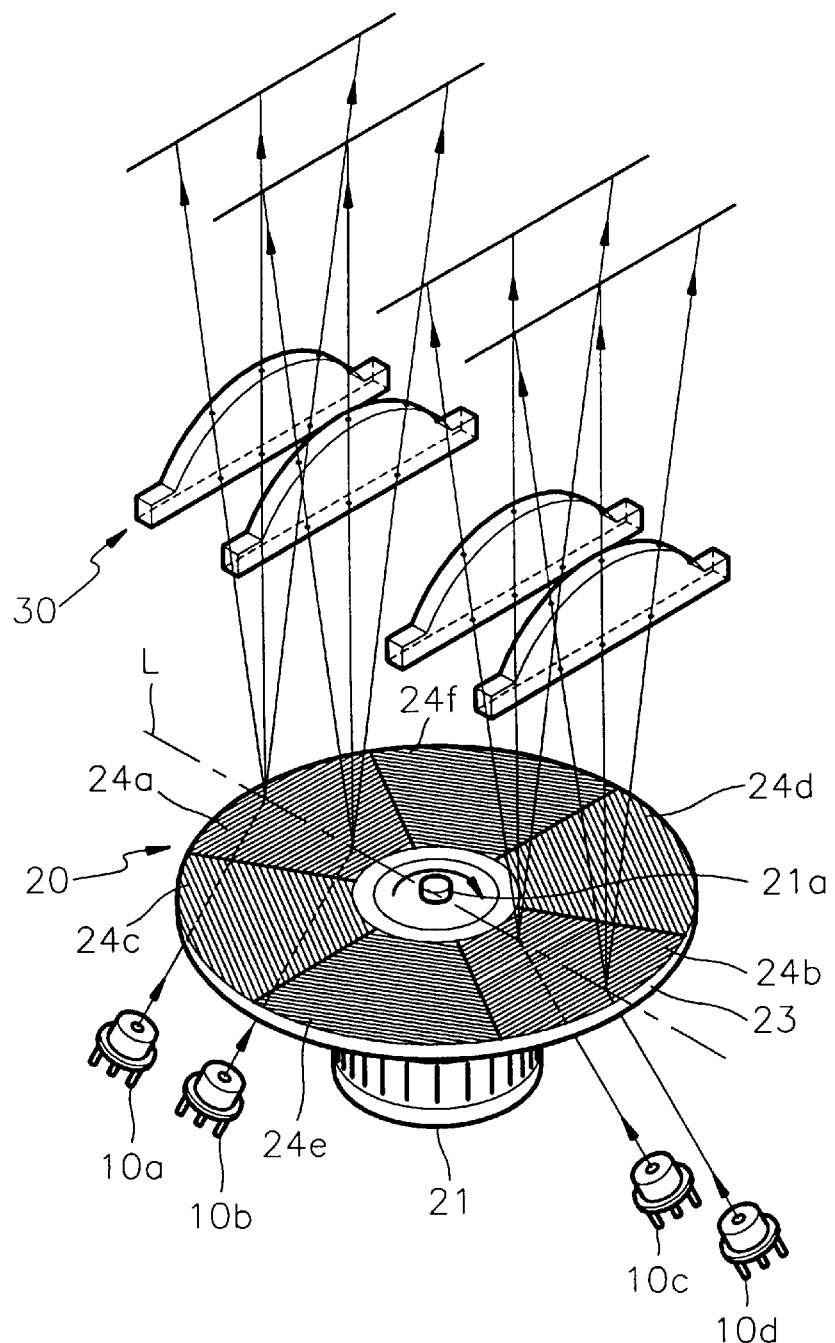
FIG. 2 is a perspective view of a multi-beam scanning apparatus according to a first embodiment of the present invention.

Referring to FIG. 2, a multi-beam scanning apparatus according to a first embodiment of the present invention is comprised of at least two optical sources (in this case four are shown) 10a, 10b, 10c and 10d for generating and emitting light, a beam deflector 20 for deflecting and projecting beams emitted from the optical sources 10a, 10b, 10c and 10d, and beam correctors 30 for correcting the deflected beams.

The optical sources 10a through 10d are semiconductor laser emitting lasers, and can be selectively driven.

The beam deflector 20 includes a driving motor 21 and a deflection disc 23 which fits on a rotation shaft 21a of the driving motor 21 and comprises of a plurality of sectors 24a through 24f.

The deflection disc 23 is equally divided into the sectors 24a through 24f. The sectors 24a through 24f are patterned to diffract and transmit incident beams to thereby deflect and project the diffracted beams in single scan line units according to the rotation of the deflection disc 23.

The optical sources 10a through 10d are arranged such that the emitted beams are diffracted and transmitted by the different sectors 24a and 24b of the deflection disc 23. For example, the optical sources 10a and 10b are arranged at one side of the beam deflector 20 so that the emitted beams are incident upon the sector 24a, and the optical sources 10c and 10d are arranged at the other side of the beam deflector 20 so that the emitted beams are incident upon the sector 24b symmetrical to the sector 24a. In this case, it is preferable that the beams emitted from the optical sources 10a through 10d are incident upon the deflection disk 23 linearly along an imaginary line L, as shown in FIG. 2.

Meanwhile, according to the rotation of the deflection disc 23, the optical sources 10a through 10d are arranged such that the emitted beams are diffracted and transmitted by the sectors 24c and 24d, then by the sectors 24e and 24f, sequentially.

The beam correctors 30 are installed along respective light paths, and correct the beams deflected and projected by the deflection disc 23. The beam correctors 30 each include an f-theta lens for correcting the focus position and scan width of a beam. The f-theta lens corrects the aberration of a beam projected in a main-scan direction according to the rotation of the deflection disc 23, and shapes the beam.

Figure 6:
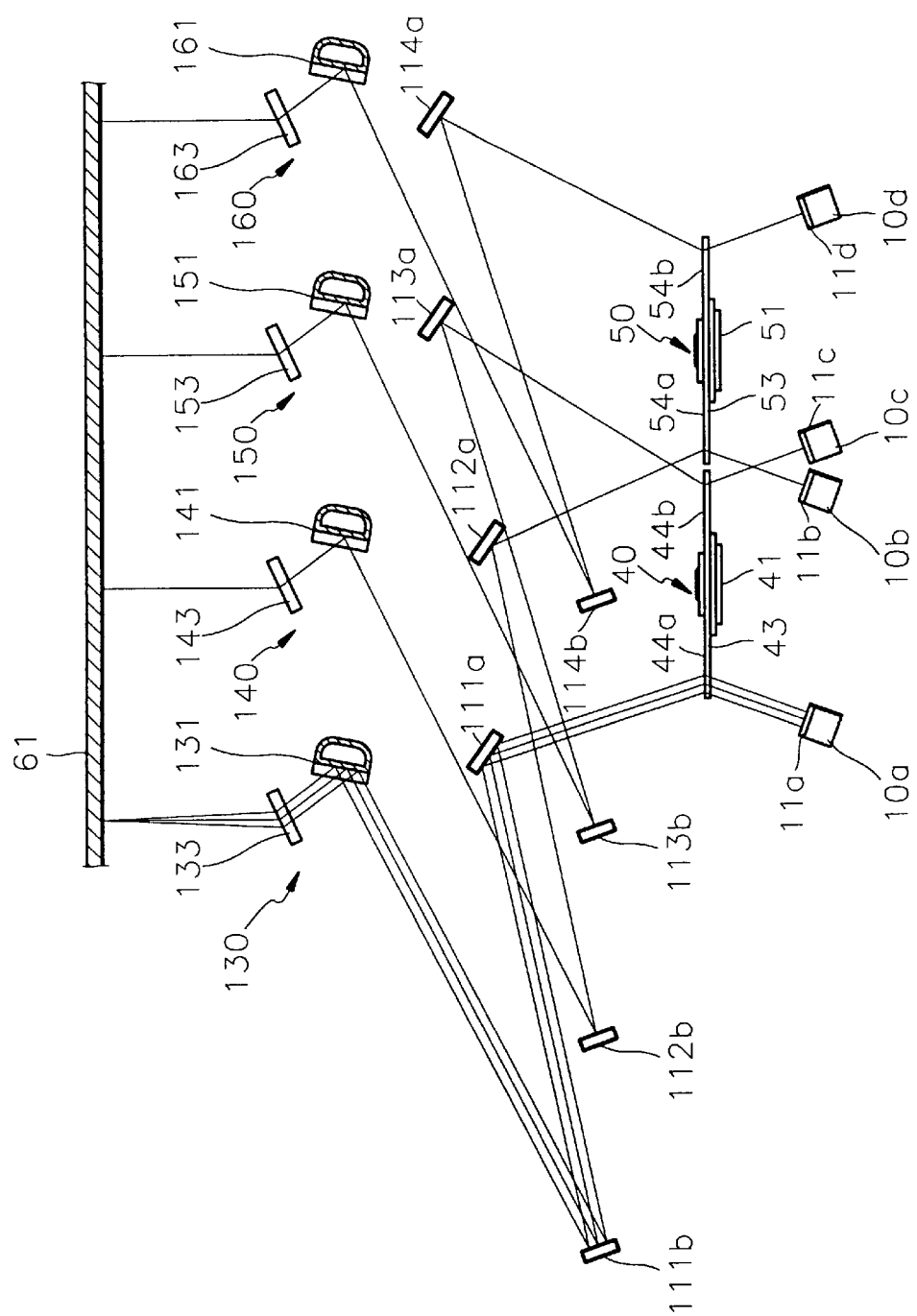
FIG. 6 is a sectional view of a multi-beam scanning apparatus according to a fifth embodiment of the present invention.

Alternatively, as shown in FIG. 6 to be described later, the beam corrector 30 can include a plurality of reflective members 131 for focusing and reflecting the beam deflected by the beam deflector 20, and a hologram element 133 for diffracting and transmitting the reflected beam.

In the multi-beam scanning apparatus according to the present embodiment, as the deflection disc 23 rotates, the beams emitted from the optical sources 10a through 10d form four different scan lines on an image plane (not shown).

Figure 3:
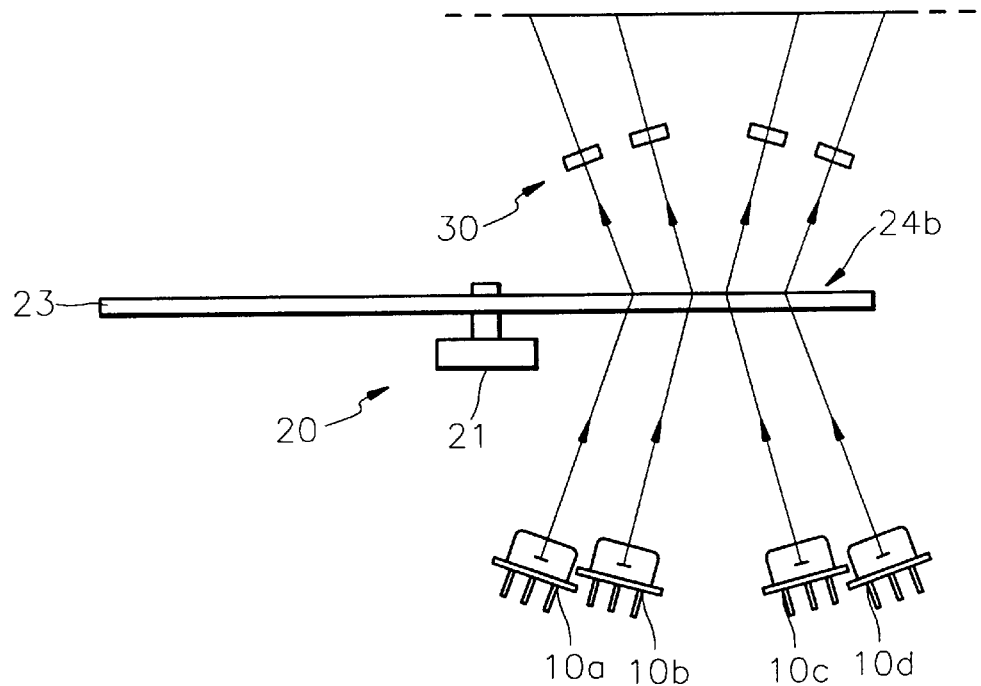
FIG. 3 is a side view of a multi-beam scanning apparatus according to a second embodiment of the present invention.

According to a second embodiment of the present invention, the optical sources 10a through 10d can be arranged so that beams emitted from the optical sources 10a through 10d are incident upon the same sector 24b of the deflection disc 23. As shown in FIG. 3, the optical sources 10a, 10b, 10c and 10d are arranged at one side of the beam deflector 20. In this case, the beams emitted from the optical sources 10a through 10d are incident upon the deflection disc 23 linearly along an imaginary line, as in the first embodiment.

Figure 4:
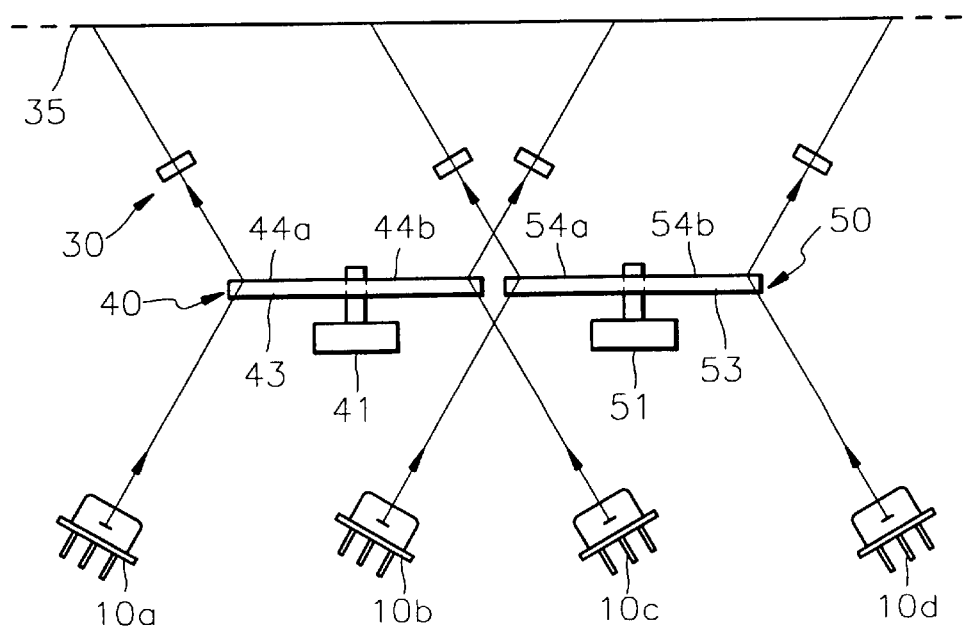
FIG. 4 is a side view of a multi-beam scanning apparatus according to a third embodiment of the present invention.

A multi-beam scanning apparatus according to a third embodiment of the present invention will now be described referring to FIG. 4. The same reference numerals as those in the previous embodiments denote the same elements. As shown in FIG. 4, the multi-beam scanning apparatus according to the third embodiment is comprised of optical sources 10a through 10d, first and second beam deflectors 40 and 50 for diffracting and deflecting beams emitted from the optical sources 10a through 10d, and beam correctors 30 for correcting the deflected beams.

The first and second beam deflectors 40 and 50, as in the previous embodiments, include first and second deflection discs 43 and 53 each comprising a plurality of sectors for diffracting and deflecting incident beams, and first and second driving motors 41 and 51 for rotating the first and second deflection discs 43 and 53, respectively.

The optical sources 10a through 10d are arranged so that beams emitted from the optical sources are incident upon different sectors 44a, 44b, 54a and 54b of the first and second deflection discs 43 and 53. For example, when the optical sources 10b and 10c are disposed so that their beams are incident to intersect each other upon the adjacent sectors 44b and 54a of the first and second deflection discs 43 and 53 as shown in FIG. 4, the interval between the deflection discs 43 and 53 can be reduced, thus allowing further miniaturization of the device.

Beams deflected by the deflection discs 43 and 53 form different scan lines on an image plane 35.

Figure 5:
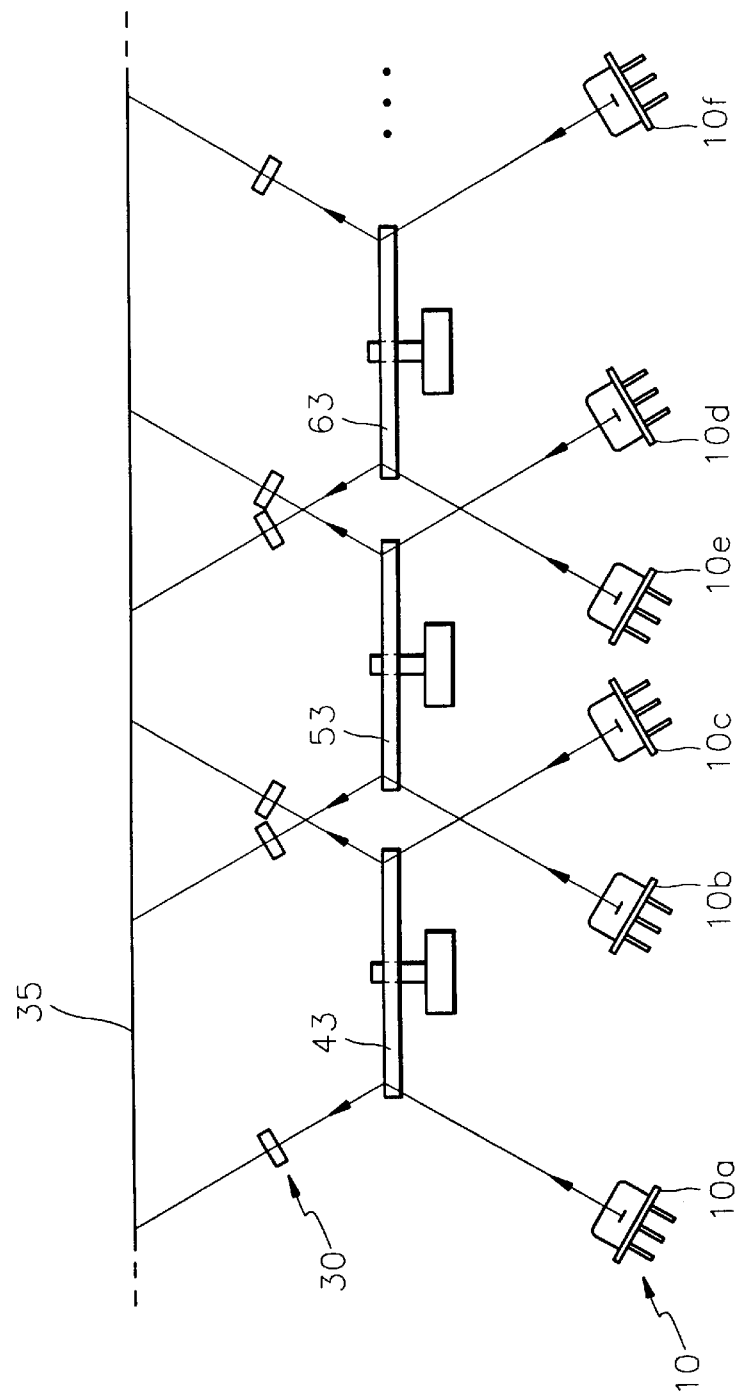
FIG. 5 is a side view of a multi-beam scanning apparatus according to a fourth embodiment of the present invention.

According to a fourth embodiment of the present invention, a plurality of deflection discs can be adopted. As shown in FIG. 5, a multi-beam scanning apparatus includes a plurality of deflection discs 43, 53 and 63, and optical sources 10a through 10f corresponding to the deflection discs 43, 53 and 63. In this case, the optical sources 10b, 10c, 10d and 10e are appropriately arranged such that beams emitted from the optical sources 10b, 10c, 10d and 10e can be projected to intersect in pairs onto neighboring sectors of the deflection discs 43, 53 and 63, and that beams deflected by the deflection discs 43, 53 and 63 also can intersect in pairs.

The aforementioned multi-beam scanning apparatus can deflect beams and project the deflected beams to a plurality of scan lines, so that it can be applied to a display device as well as an electrophotographic color printer.

FIG. 6 shows a multi-beam scanning apparatus according to a fifth embodiment of the present invention. In this embodiment, the same reference numerals as those in the previous embodiments denote the same elements. Referring to FIG. 6, beams emitted from the optical sources 10a through 10d are changed into parallel light by collimating lenses 11a through 11d to be incident upon the first and second deflection discs 43 and 53.

The paths of beams deflected by the deflection discs 43 and 53 are changed by a light path changing means such as a plurality of mirrors 111a, 111b, 112a, 112b, 113a, 113b, 114a and 114b disposed along the respective light paths.

The beams whose paths are changed by the light path changing means are corrected by beam correctors 130, 140, 150 and 160. The beam correctors 130, 140, 150 and 160 correct the aberration of beams traveling in the main scan direction and shape the beams, and include reflective members 131, 141, 151 and 161 disposed on the light paths for focusing and reflecting incident beams, and hologram elements 133, 143, 153 and 163 for diffracting and transmitting the reflected beams, respectively. Preferably, the reflective members 131, 141, 151 and 161 are curved mirrors for reflecting and focusing beams simultaneously to condense on a photoreceptor, such as a photoreceptor belt 61.

The hologram elements 133, 143, 153 and 163 diffract and transmit beams reflected by the reflective members 131, 141, 151 and 161 in a sub scan direction with respect to the photoreceptor belt 61, e.g., in the direction perpendicular to the progress direction of the photoreceptor belt 61.

As described above, the multi-beam scanning apparatus according to the present invention adopts a deflection disc for deflecting and projecting at least two beams together, so that the device can be compactly configured. The multi-beam scanning apparatus also adopts a deflection disc for diffracting and transmitting incident beams, so that deflected beams can be more stably scanned than by the conventional rotating polygonal mirror.

It is contemplated that numerous modifications may be made to the multi-beam scanning apparatus of the present invention without departing from the spirit and scope of the invention as defined in the following claims.

What is claimed is:

1. A multi-beam scanning apparatus comprising:

at least two optical sources which emit beams of light;

a beam deflector including a deflection disc having a plurality of sectors which diffract and transmit incident beams, and a driving source which rotates the deflection disc, for deflecting and projecting the beams emitted from the optical sources; and a beam corrector, installed along a light path, for correcting the beams deflected by the beam deflector, wherein at least one of the optical sources is installed so that a beam emitted from the one optical source is incident on a first sector of the deflection disc, and at least another optical source is installed so that a beam emitted from the other optical source is incident upon a second sector symmetrical to said first sector, and wherein the apparatus comprises at least two deflection discs, and the optical sources are disposed so that the emitted beams are incident intersectingly upon adjacent sectors of the deflection discs.

2. The multi-beam scanning apparatus as claimed in claim 1, wherein the plurality of sectors are patterned at equal intervals on the deflection disc, and diffract and transmit incident beams according to the rotation of the deflection disc to project the diffracted beams in units of a single scan line.

3. The multi-beam scanning apparatus as claimed in claim 1, wherein the optical sources are installed so that the beams emitted from the optical sources are incident on the deflection disc at a line.

4. The multi-beam scanning apparatus as claimed in claim 1, wherein the beam corrector comprises a plurality of f-theta (f-$\theta$) lenses for compensating for a focus position and a scan width of the incident beams.

5. The multi-beam scanning apparatus as claimed in claim 1, wherein the beam corrector comprises:

a reflective member disposed in the light path, for focusing and reflecting a beam deflected by the beam deflector; and a hologram for diffracting and transmitting the beam reflected by the reflective member.

6. A multi-beam scanning apparatus comprising:

at least two optical sources which emit beams of light;

at least two deflection discs each including a plurality of sectors which diffract and transmit incident beams, and a driving source which rotates a corresponding one of the deflection discs, for deflecting and projecting the beams emitted from the optical sources; and beam correctors for correcting the beams deflected by the deflection discs, wherein the optical sources are disposed so that the emitted beams are incident intersectingly upon adjacent sectors of the deflection discs.

* * * * *